United States Patent Office 3,526,893
Patented Sept. 1, 1970

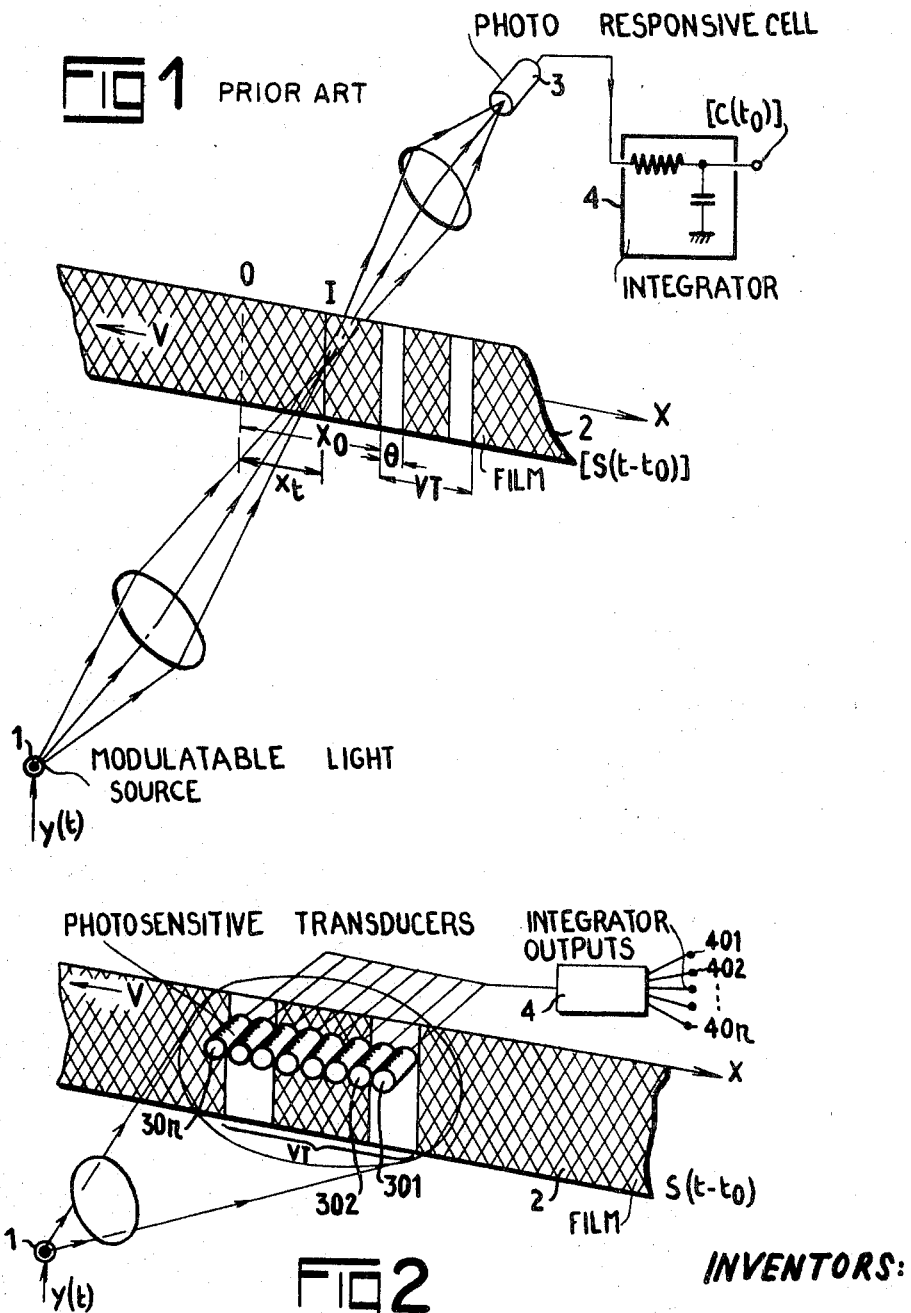

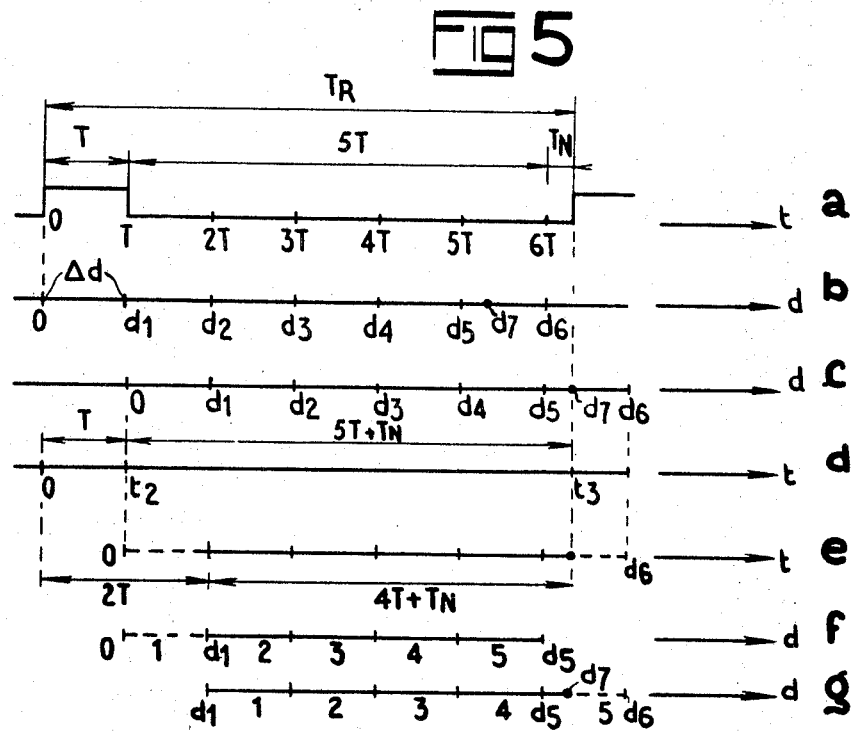
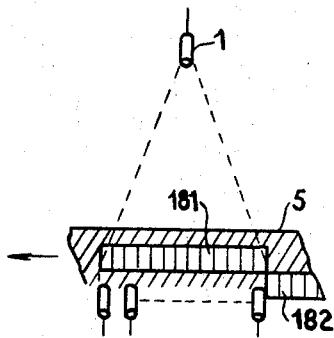
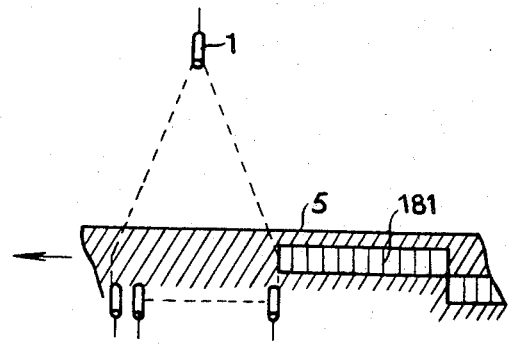

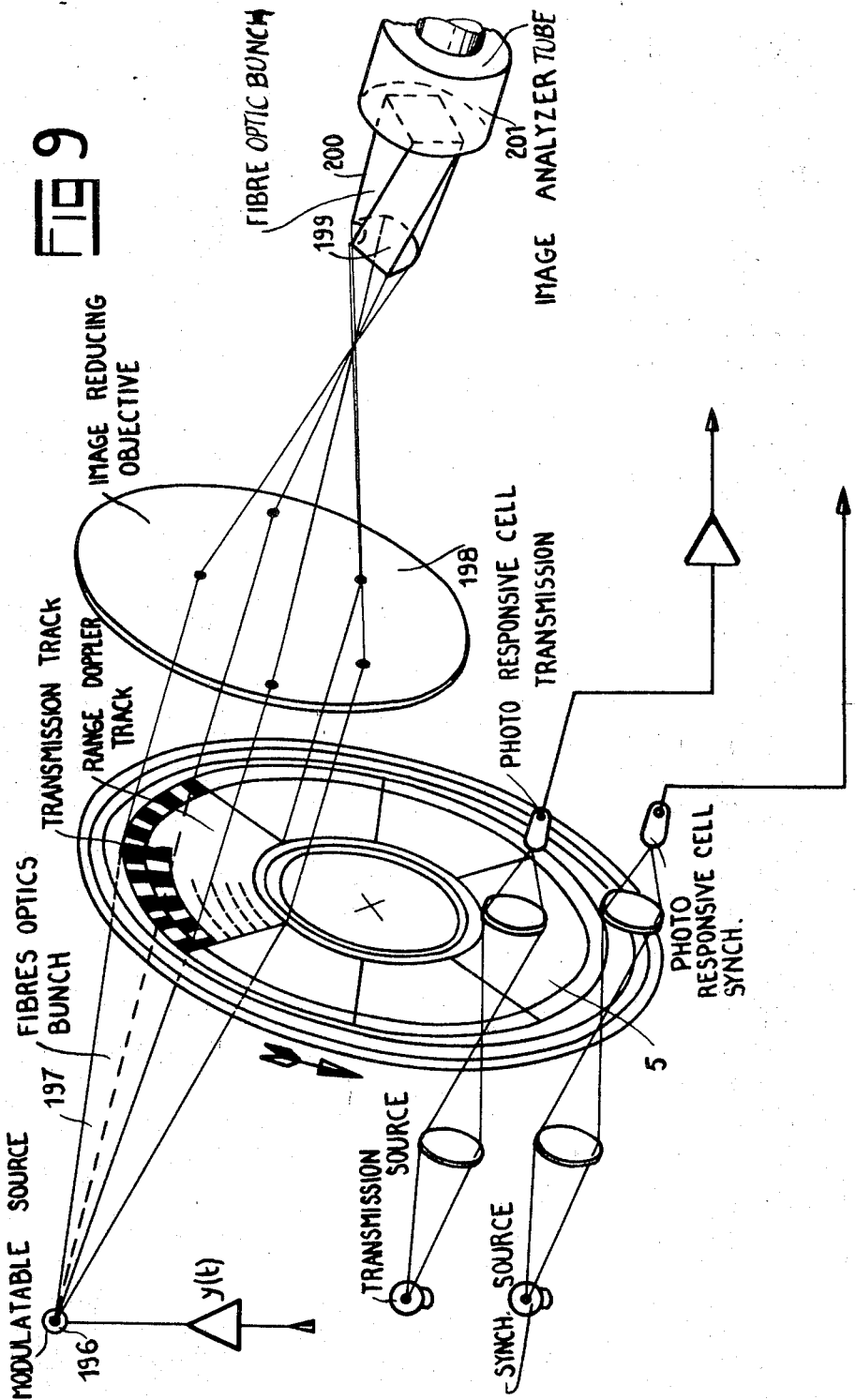

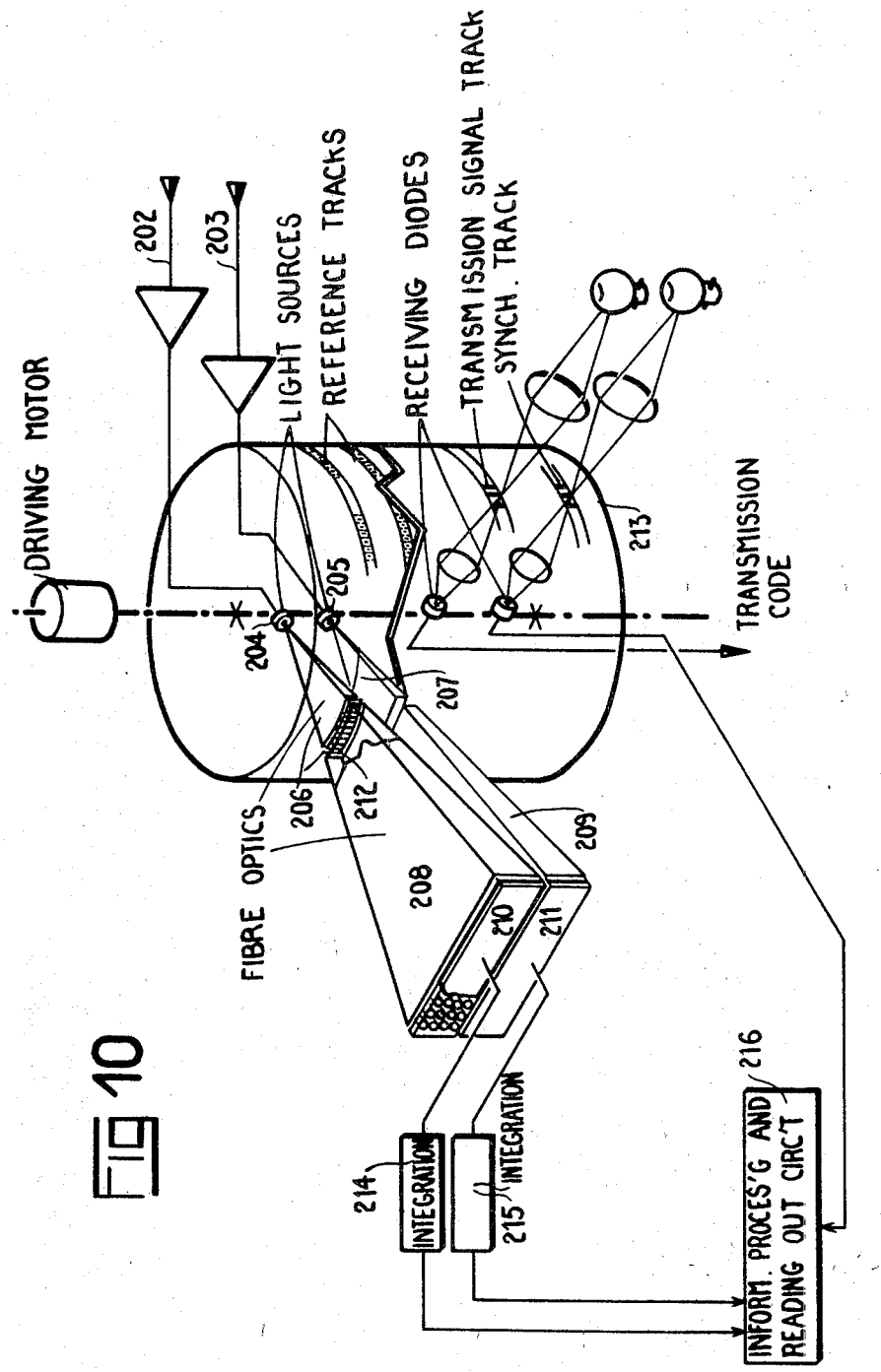

3,526,893
OPTICAL CORRELATION SYSTEM FOR RECEIVED RADAR SIGNALS IN PSEUDO-RANDOMLY CODED RADAR SYSTEMS
Claude Skenderoff, Rueil-Malmaison, Léonidas Symaniec, Sartrouville, and Jacques Marcel Darricau, Kremlin-Bicetre, France, assignors to Compagnie Francaise Thomson Houston-Hotchkiss Brandt, Paris, France, a corporation of France
Filed Feb. 21, 1968, Ser. No. 707,122
Claims priority, application France, Feb. 22, 1967, 95,949
Int. Cl. G01s 9/44
U.S. Cl. 343—5                                  11 Claims

ABSTRACT OF THE DISCLOSURE

A film, placed on a rotating disc, or drum, carries K similar decoding tracks, each being representative of a pseudo random function, as transformed by the Doppler effect, the film passing before a light sensitive receiver during a time T, light being transmitted on said film from a light source modulated by the received signal to be analyzed, in order to obtain distance detection of a range of KT.

---

The present invention relates to correlation systems and more particularly to an optical correlation system to decode signals received from pseudo-randomly coded radars.

Optical correlation apparatus, to operate in real time, permit an almost instantaneous determination of the correlation function of the signal and are particularly useful in various technical fields, particularly in telecommunications and in radar systems. Correlating the signals optically with the correlation functions improves the performance of such telecommunication equipment. A further advantage is the feature that, almost instantaneously, bi-dimensional decoding can be obtained, since optical correlation systems can simultaneously treat a pair of parameters, for example, radial speed of a radar target, as well as distance, and both in a single information channel.

A further advantage of these optical correlation systems is, that they provide a relatively simple apparatus to analyze a large number of data in real time, for example, several hundred thousands or millions of data, while at the same time providing for a substantial reduction in size and complexity, and thus of cost, of the apparatus for the decoding, with respect to decoding apparatus utilizing solely electronic devices.

Optical correlators are preferred to electronic circuits for these reasons, and further, since the electronic circuits permit analysis only of a single dimension or a single parameter, for example, distance, a second factor (such as radial speed) then requiring subsequent evaluation or additional channels of Doppler filters.

Optical correlation systems, and particularly optical system for use with radar are known. Principally, they include a source of modulatable light, that is, a source which can be modulated by a received signal $y(t)$, a transparent support, such as a film, which is of variable transparency and coded, the transparent support of film moving at a constant speed, an assembly of parallel tracks having the signal code of the reference transmission $S(t)$, as affected by predetermined Doppler shifts, placed thereon. Optical-electronic transducers and integrators produce a correlation signal for each of the distance Doppler signal channels which are provided. The mobile support or carrier is usually a disc or a drum, carrying a track which is coded to contain the radar transmission, and reference tracks, coded to represent Doppler shifted signals. Additionally, special tracks, for example control tracks to synchronize the transmitter or the radar received, or to provide for synchronization of reading of the products of integrated correlation functions may also be provided.

Radar systems having a pseudo-randomly arranged code, and optical correlators, as previously proposed, nevertheless have certain disadvantages. For example, the distance range which may be explored without ambiguity is small with respect to the range of the radar itself. This limitation is primarily due to the apparatus provided, and the fact that the optical correlation apparatus does not permit discrimination of echoes in which the difference of distances, with respect to a radar, is the same, or a multiple of a quantity D which corresponds to the path of a pulse during time T of transmission. Thus, the targets reached by the radar and having distances $d$, $d+D$ ... $d+nD$ will give the same distance information. As a result, reception in such systems is limited to a time T which is the same as the transmission time. In actual practice, time T is chosen to be relatively great, for example, a long pulse of several milliseconds. This is due to various considerations, one of them being that the total number of cells to resolve the distance signals may be very great, for example, 500,000 separate distance channels may be needed, each corresponding to a sample of a signal covering a comparatively small distance range each. The extent D of the zone of the distances which may be explored is great and thus permits a specific localization, even at a great distance. The effectiveness of the apparatus is also increased, considering that during a time T of reception, integration and correlation is done only with respect to signals received during a time limited between 0 and T, in accordance with their position in the zone of the distance of the range D.

It is an object of the present invention to provide an optical correlation system, applicable particularly to pseudo-random coded radars, which permits detection of distances, without ambiguity, in a zone which is K times greater than zone D which corresponds nearly to the time T of transmission, and further provides an average probability of response giving speed and localization of a target, K times greater than for prior systems.

SUBJECT MATTER OF THE PRESENT INVENTION

A transparent, variably coded support, or film, carries K identical assemblies of parallel reference tracks. Each of these assemblies corresponds to the total number of resolution cells of the distance Doppler under consideration. The assemblies are shifted, one with respect to the other, in stair-step fashion, in a direction perpendicular to their movement, and approximately by an amount corresponding to the transverse width of any assembly. Optical-electrical transducer means are provided, as well as integration means, both divided into K bi-dimensional identical zones, and presenting the same number of integrating points with respect to the reference tracks and with respect to the desired Doppler effect, the points corresponding to the number of data, or the distance resolution of the distance zone being investigated.

In accordance with a feature of the invention, the film is in the form of a rotating disc with sectors located thereon, on which the reference tracks are placed; or, the film may be a rotating drum with lateral sub-divisions carrying the track assemblies.

In accordance with another embodiment of the present invention, the transducer and integration means include optical fibre assemblies illuminating a rectangular surface of a photocathode of an analyzer tube, such as a vidicon or an orthicon, divided into K zones corresponding to K reference track assemblies on the film. The scanning of each zone, within the tube, is done after the termination of integration over a zone in synchronism with motion of the film.

In accordance with another aspect of the present invention, the track assemblies are shifted only twice, successively, assemblies of the order of 1+3n, 2+3n, 3+3n being subsequently placed at the same levels 1, 2, and 3 of the track assemblies. The number of the zones of the analyzer tube is then also limited to three, the reading of a zone being carried out during a time identical to that of time T of the transmitted signal, with a shift of 2T after the beginning of the integration of the zone. A similar reading is then done subsequently for the three zones.

The structure, organization, and operation of the invention will now be described more specifically with reference to the accompanying drawings, wherein:

FIG. 1 is a general schematic diagram of an optical correlation system with pulse compression, and for real time operation;

FIG. 2 is a simplified schematic diagram illustrating a signal sampling arrangement utilizing staggered photosensitive receiving devices;

FIG. 5 is a chart useful in the explanation of the present invention;

FIGS. 6a and 6b are diagrams illustrating scanning of tracks in accordance with FIG. 5;

FIG. 9 illustrates, in schematic form, an arrangement of the system with pulse compression utilizing an optically scanned disc and fibre optics;

FIG. 10 illustrates also in schematic form an arrangement of the system with pulse compression utilizing a dual-channel drum, fibre optics and matrices of photosensitive cells.

Figure 3:
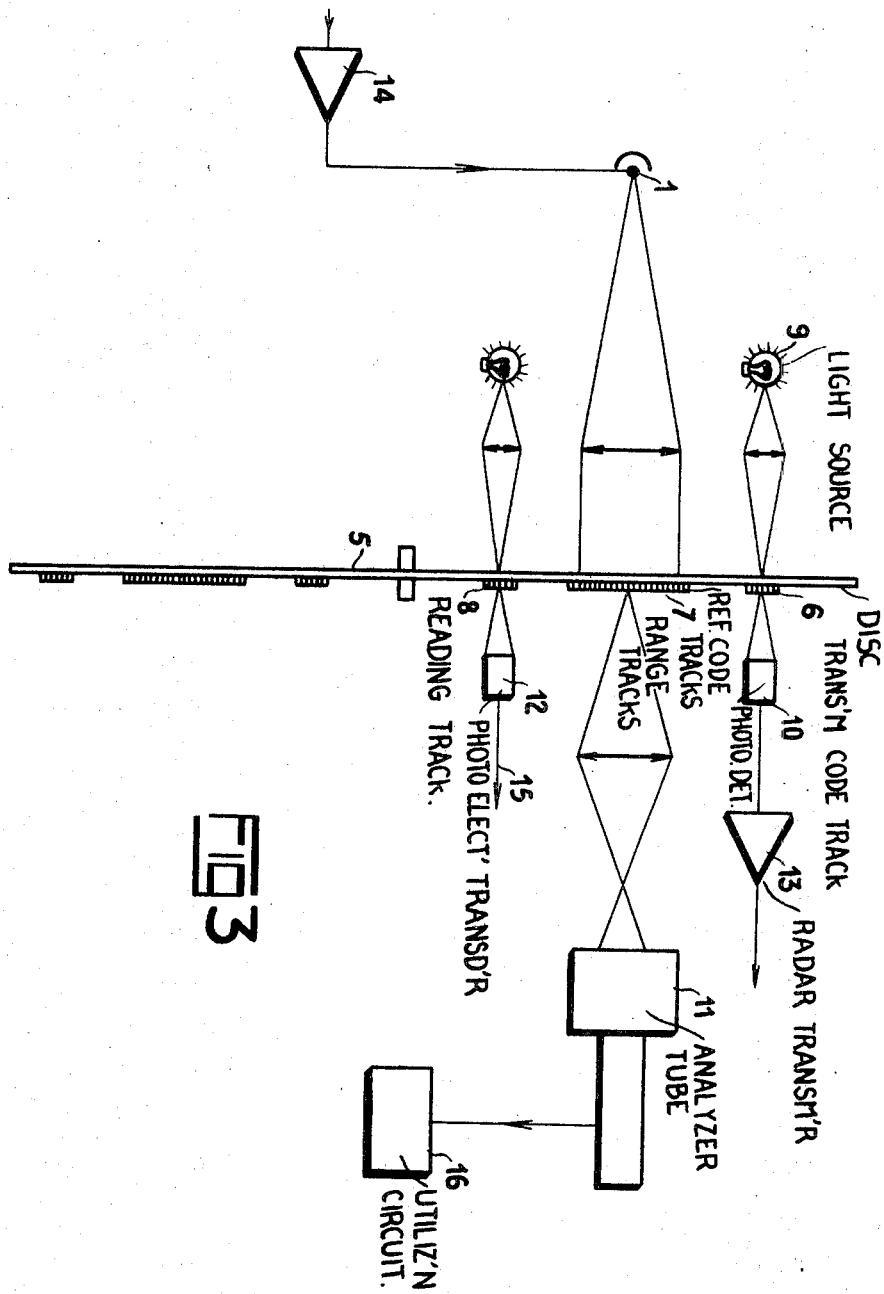
FIG. 3 is a diagram illustrating the general arrangement of the system utilizing an optically scanned disc.

Modern theories of radar show that the performance obtained from a signal transmitted from a radar set is improved to the extent that its duration T, and its band-width or spectral distribution B is increased. In particular, coded signals should have a product BT which is as large as possible. In order to analyze these signals, it is necessary to utilize receivers, preferably, and ideally, having filters which are adapted to receive these signals, or correlation systems. Let $S(t)$ be the signal emitted during a time T, and $y(t)$ be the received signal, or an echo signal in the form of $KS(t=t_{01})$. A correlation function is obtained when the emitted signal, passing through a receiver adapted to receive the signal, is shifted during a known time interval $t_0$ which may be a variable interval:

$$C(t_o) = \int_0^T y(t) \cdot S(t - t_o) dt \quad (1)$$

providing for coincidence, or auto-correlation of signals $y(t)$ and $S(t-t_0)$ due to the different shifts of $t_0$ permits solution for the value of $t_{01}$, or the time during which the signal is emitted in order to obtain, for example, the time of the emission and return of the radar echo, and, further, to obtain the best separation of the signal from noise at the output of the receiver. Resolution of the preceding equation requires three operations:

a multiplication of signal $y(t)$ and signal $S(t)$ by different shifts $t_0$ between themselves;

obtaining different shiftings of $t_0$;

and integration of the product for each of the shifts during a time which is the same as the duration of the transmitted signal.

An optical correlating device, operating in real time, may be used for such radars and particularly if it is desired to account for a second parameter which is constituted by the Doppler effect and affecting the received signal.

There is a code which is particularly well adapted for correlation, because of the simplicity by which it can be produced; it is phase modulation, in pseudo-random form, obtained by a shift register with a feedback loop. It has the property to be in the form of a random succession of digits of phase zero or $\pi$, with equal probability. The average value of such a signal is very close to zero, and the total number of digits is always uneven. If one utilizes $n$ cells of shift registers, a sequence of $N=2^n-1$ is obtained during the entire period T.

FIG. 1 illustrates the principle on which the optical correlation system with pulse compression in real time operates. The essential elements are:

a modulatable source of light 1, that is a source modulatable by $y(t) = KS(t-t_{01})$;

a screen, or film for light transmission on which, in spatial arrangements in form of variable transparency, a reference signal of $S(t=t_0)$ is carried;

and a photo responsive cell 3, in light receiving relation to the light from source 1 through the film 2, followed by an integrator 4.

A signal varying in time in accordance with the function $y(t)$, is applied to source 1, to modulate source 1 linearly with respect to the intensity of emitted light. Film 2 passes in a plane in front of the light, at its focal point, at such a speed that the time of passage of the spatial signal is equal to the time T during the signal. Cell 3 thus detects a certain luminous energy which is the product of the luminous signal, and the transparency represented on the film, and corresponding to the reference signal $S(t-t_o)$. Integrator 4, connected to the terminals of the photosensitive cell, integrates the energy detected by the cell during the time T of the signal.

The elementary, simple assembly represented by FIG. 1 gives only a single value for the correlation function $F(t_o)$, corresponding to a pretermined shift $t_o$ between signal $y(t)$ and the signal $S(t)$.

In order to obtain, simultaneously, several values for the function, one solution is to superimpose, in the direction of displacement of the film, so many emitters and receivers as one needs in order to obtain resolutions of the function; as an equivalent, however, to substitute for various modulated sources for a single return signal from the radar set, a single source illuminating simultaneously all the photosensitive receivers may be used. The number of the photosensitive receivers then will correspond to the number of solutions of the function.

The principle of sampling of the correlation function, for example by shift of the photosensitive receivers or transducers, is schematically shown in FIG. 2, where photosensitive transducers 30–1 to 30–n are schematically indicated. The film, in this instance, may be the surface of a drum, shown in FIG. 2 in developed form.

The delay $t_{01}$, as well as another parameter, such as deformation of the signal due to the Doppler effect may be identified when utilizing a single modulatable source for the return signal and utilizing a number of parallel codes. These codes are arranged on tracks, each track corresponding to the number of photosensitive receivers which are necessary to determine maximum correlation in order to obtain resolution of ranges, due to the range-Doppler effect. In order to avoid undue multiplication of the number of cells and the integrators associated therewith, one may use a single image analysis tube, such as an image orthicon or a vidicon tube.

In actual practice, the transparent support or film carries the transmission codes, which are transduced by a photodetector and applied to the emitter, in order to obtain the transmitted signal $S(t)$, phase modulated in pseudo random manner. For radar systems which do not use separate transmission and receiving antennas, a blanking signal may further be supplied and coded on the film, alternatively controlling blanking of the emitter, and opening of the receiver circuit, after termination of transmission and, again enabling the transmitter and blocking the receiver for the next transmitted pulse.

A system, in accordance with the present invention, permits sampling of received signals with respect to distance ranges, during a duration K times higher than that of time T of transmission. In order to achieve this result, an assembly of reference tracks, arranged in parallel, are carried on the film. The photo receiving elements, transmitting the correlation products, are arranged to be associated with these tracks and are also repeated K times at distinct locations. The results of the integration are read successively during K sequences, each of the same duration. In FIG. 2, the outputs from one integrator 4 are indicated at 40–1, 40–2 . . . 40n; the velocity of the traveling film 2 is indicated by the arrow V, the time during which the optical transducers 30 are scanned by VT.

FIG. 3 illustrates an example of an optical correlation device in accordance with the present invention, in schematic form. The principles and the operation of the invention will become clear in connection with its description.

A film is applied to a rotatable disc 5; rather than a disc, a drum may also be used, and in this case the film will appear similar to film 2 in FIG. 2. Disc 5 (FIG. 3) carries a first transmission code track 6; a certain number of reference codes tracks 7, the number corresponding to the required number of range Doppler channels to be provided. Additionally, a reading synchronization track is formed on the disc. The other essential elements are a source of light 9, associated with a photo detector or photo cell 10 in order to provide the transmission code; a source of light 1 (as before—FIG. 1) modulated by the return signal y(t) and illuminating all of the distance Doppler tracks or channels 7, which can read the minimum distance and the maximum range of the radar; an analysis tube 11, which receives on a photo cathode the image of all the distance Doppler channels, and effects integration, during the measuring time during which the return signal is received with the distance Doppler signals recorded on tracks 7 on disc 5. In addition, an optical transducer 12 is provided in order to apply synchronizing signals from reading track 8.

Light source 1 is modulated, for example, from the intermediate frequency signals of a radar receiver 14. The output of tube 11 is applied to a utilization circuit 16. The signal derived from photoelectric transducer 12, schematically indicated as appearing on a line 15 is a synchronizing signal, which is applied to synchronize scanning of the tube 11. The photo cell 10 controls radar transmitter 13.

The transmitted signal is phase coded by a pseudo-random coding etched, engraved, or otherwise recorded on the disc, on track 6. As the disc turns, a bundle of light, continuously emitted by source 9 and focused on the track 6 is interrupted in the rhythm of the passage of black or white of the code. These luminous impulses, transduced by photo cell 10, are then utilized to control radar transmitter 13. The transmitted signal thus has the characteristic of the emitted code recorded on the disc. Its time duration is proportional to the length of the transmission code recorded on the disc, and inversely proportional to its speed of rotation.

The return signal, as stated before, and preferably at the intermediate frequency, is applied from receiver 14 amplified, and used to modulate light source 1 which emits a luminous signal which is a replica of the return signal, and illuminates all of the range Doppler code tracks on the disc; or, alternatively, a sector of the disc which carries a number of the distance Doppler codes, and correspond to a certain range, for example within a certain window, which one desires to investigate.

The optical device on which the image illuminated by source 1, after having passed through disc 7, is illuminated, is shown as the photo cathode of an image analyzer, for example, of the television transmitter type tube.

The light modulated by the return signal from the radar thus passes through all the code tracks of the distance Doppler functions. At the instant at which the first return pulse appears, the first transparent digit of the channel to be analyzed being a replica of the return signal, will be in a certain angular position and will transmit entirely, in its position, on the photo sensitive surface of the analyzer tube, the first pulse of the return signal. At the time when the second return signal appears, the disc 5 has turned and the second transparent digit has taken the place of the first, such that the second light pulse is, newly, entirely transmitted at the same point of the light sensitive surface. The return signal, and the reference code thus are in phase correspondence.

The sequence of operation above described thus will repeat during the entire duration of the return signal, and the target of the analyzer tube will accumulate at a certain point a quantity of charge which is proportional to the light impulse, during the entire time during which the return signal appears. In other words, that precise point on the target of the tube, an integral of the products of the return signal from time 0 to T has been obtained (T being equal to the duration of the signal) by the corresponding reference code, and for zero shift between the two signals. Other points of the target of the tube have, simultaneously, carried out the same operations, but for different shifts and a pattern of accumulated charges during the time T on one line corresponds thus to the form of the correlation function. Scanning of the target by an electron beam, synchronized with the signal 15 from track 8 (FIG. 3) will then obtain the correlation function at the video output of the analyzer tube; this output can be connected to a utilization and display circuit 16.

Figure 4:
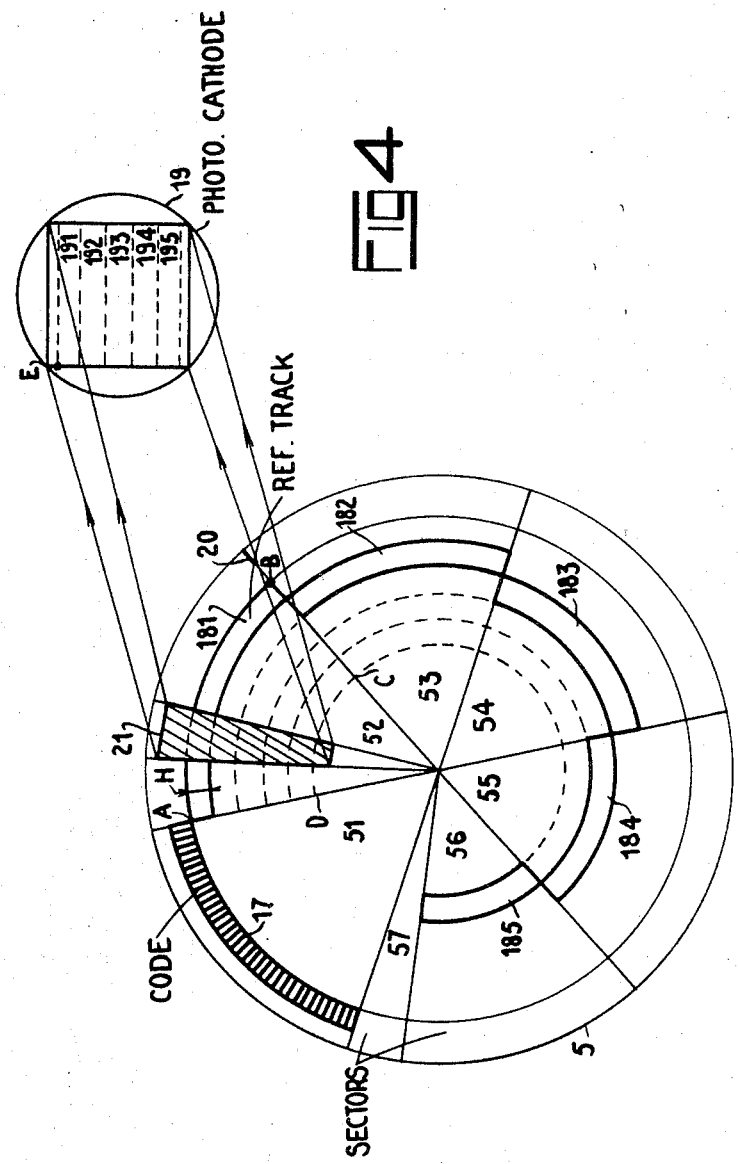
FIG. 4 is a top view illustrating the arrangement of tracks on the disc and the integration means.

FIG. 4 is a plan view of disc 5, and, in connection with FIG. 3, will best illustrate the operation of the present invention; of course, other forms and discs of other pattern arrangement may be used.

Disc 5 is divided into six equal sectors 51 to 56, and into a seventh, smaller sector 57. A first sector 51 carries a pseudo-randomly arranged code in order to control, in a pseudo-random manner, the phase (0 or $\pi$) of the transmitted signal. This code is carried on track 17 (corresponding to track 6, FIG. 3). The next sector, sector 52, contains a first assembly or array of reference tracks 181, each arranged in parallel to the next one, in the order of concentric circle sectors. Each of these tracks is an optical representation of intermediate frequency, pseudo-randomly phase coded indicia, representative of a coded signal modified by the second parameter in order to determine a Doppler effect of known magnitude or value. The difference in frequency, or the frequency step, between two adjacent tracks corresponds to the resolution of the Doppler-shifted signal which is received. The total number of tracks is determined by the number of Doppler-shifted channels, to be received, and desired by the user.

In accordance with the invention, the next subsequent sector 53 carries an assembly or array of tracks 182 identical to those of the preceding sector, shifted, however, radially towards the center by a distance H of the assembly or array 181. Since the radial shift is towards the center, a certain geometrical reduction will occur. In case of a rotating drum, subsequent arrays are geometrically similar. The height H is the minimum distance of shift, in a transverse direction, and perpendicular to the movement of the film. Subsequent arrays 183, 184 and 185 in sectors 54, 55 and 56 are shifted in like manner.

The time taken for a revolution of disc 5 determines the transmit-receive repetition rate of the transmitted code.

As seen in FIG. 5, line $a$, a transmission time T is followed by a duration 5T of passage of sectors, carrying the arrays of tracks, and time TN corresponding to the terminal sector 57. The subsequent graphs 5b and 5c indicate, respectively, the distance staggering of the reflected received signals between the beginning of time $t_1=0$ and the end of the time $t_2=T$. The receiver will be capable of reception between the time $t_2$ (FIG. 5, line $d$), that is, at the end of transmission, and $t_3$, the beginning of the next cycle. Distance ranges between the maximum limits 0 and $d_6$ (see line $e$, FIG. 5) may thus be selected, in accordance with the relative arrangement of the mosaic of the photo-electrical transducer elements with respect to the film. If, at time $t_2$, the setting is as indicated in FIG. 6a, then the distance selection will correspond to that shown in the graph of line $f$, FIG. 5. The period, shown in dashed line, between 0 and $d_1$, corresponds to a period of reduced integration time, linearly varying from 0 to T, as a function of the stretching of echoes occurring in that zone. This reduced auto-correlation period is compensated, however, by the fact that the energy reflected by a target varies as a function of the distance from the radar transmitter by the inverse power of 4, that is in accordance with $1/d^4$. Close-by targets have a lesser Doppler resolution; the extent of the spectrum of frequencies is closely tied to the duration of the signal. Precision of speed determination varies in inverse function to the duration of the signal. The radar receiver, as indicated, may be blocked at the instant 6T. If the setting at the instant $t_2$ is as seen in FIG. 6b, the distance selection will be that illustrated in line $g$, FIG. 5, that is, between $d_1$ to $d_6$, while the sector 56 passes by the photo-optical pickups and integration proceeds during a duration T of echoes situated between the distances $d_5$ and $d_7$; and reduced integration for those situated between $d_7$ and $d_6$, and with a minimum duration TN for distance $d_6$; thereafter, that is at time $t_3$ the receiver circuits will block.

The explanation, above described with the help of FIGS. 6a and 6b, is not to be considered as a limitation, but only cited as an example. The form of the film and the tracks carried thereon, are a particular function of predetermined conditions of application, and of the operating characteristics of the radar system utilized with the optical correlation system of the present invention. The time TN of the passage of the sector 57 may correspond, for example, to distances beyond the range of the radar and this sector then need not carry any tracks or array of tracks and will not have any function in the compression of pulses.

In accordance with an aspect of the present invention, the modulatable light source 1 (FIG. 3) illuminates a region of the disc 5 which corresponds to a sector angularly covering a zone defined by the points A, B, C, D. At the other side of the disc, the image of the sector is receivded, for example, by means of an optical path in light receiving relation to the film, and projected on a photo cathode 19 of an image analyzer tube, such as a vidicon. Disc 5 turns; the target of the vidicon then will, successively, have track arrays projected thereon in zones 191, 192, 193, 194, 195 (FIG. 4) corresponding to track arrays 181, 182, 183, 184, 185. Scanning of the image tube 11 is synchronized with the rotation of the disc by the synchronizing signals supplied from the disc in accordance with known procedures. Peripheral markers 20 indicate, symbolically, a synchronizing track (FIG. 4); horizontal line scanning of the analyzing tube 11 may thus be synchronized so that it will be at an initial point E (FIG. 4—small view) for the first scanning line to scan the first zone 191, just after the end of the disc integration time for all the points of zone 191, and corresponding to the array of tracks 181. In other words, scanning of the two will occur after the point terminal or trailing points of the tracks (on radial line B–C of FIG. 4) again come to the beginning, or leading in, radial line A–D, and only after the disc has rotated and the particular track array has left the zone illuminated by the modulated light source 1. At that moment, the next array 182 enters, entirely, into the illuminated light zone and is subjected, during time T, to integration of the data thereon after radial line B–C enters into the illuminated zone. During reading of zone 191 on tube 11, and during its erasing, integration continues in zone 192, and starts in zone 193 after arrays 182 and 183 have left, and entered and again left successively, respectively, the zone illuminated by light source 1 during subsequent periods T. In the same manner, other zones and sectors are illuminated and integration follows. It can be seen that reading of any time occurs after a delay of T and the echo signal of function $y(t)$ is obtained after a shift of between T and 2S with respect to the beginning of the return signal. The reading of the zones 191 to 195, individually, of course is carried out during the time period of T.

Figure 7:
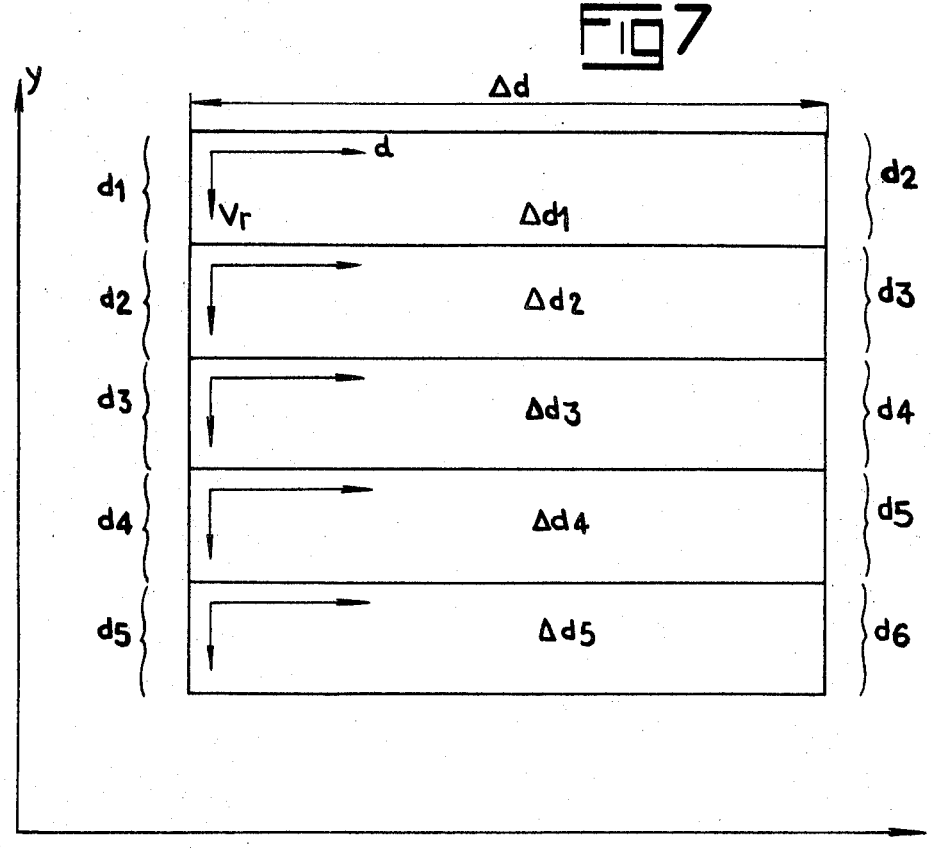
FIG. 7 illustrates, in schematic form, a readout arrangement utilizing television tubes.

In accordance with the described procedure, a distance range is covered by a signal of T duration and having an amplitude of $5\Delta d$, in which the distance $\Delta d$ corresponds to the time to reach a target and return therefrom during period T. This range may be visualized with respect to the alignment of an antenna, with respect to a television receiver, and explained in connection with FIG. 7. Horizontal scanning corresponds to the distance leading within a range $\Delta d$; vertical scanning corresponds to reading at radial speed, for each of the five different zones 191 to 195 of photocathode 19 (FIG. 4) of tube 11. Considering again FIG. 5, line $g$ and FIG. 6b, it is noted that for a first zone of distances between $d_1$ and $d_2$, corresponding to a first range $\Delta d_1$ within the range $\Delta d$; in the following zone, the distances between $d_2$ and $d_3$ cover a second range $\Delta d_2$, of general extent $\Delta d$, etc. The time for the integration is limited by the duration of the signal so that noise signals do not interfere with the wave shape of the signal. Additionally, the return signal from the radar is always entirely integrated at the entrance point of the analyzer 11 in which the ordinate corresponds to the Doppler parameter and the abscissa to distance ranges; the gain due to signal compression is thus that of an ideal receiver.

As seen in FIG. 4, the zone illuminated by the modulated light source may be reduced by a window 21, so that it does not cover the entire sector by only a fraction of the spatial extent of the reference track arrays. One need not explore at all times all tracks; for example, a fraction of $\frac{1}{5}$ of the total of N information distances may be contained in a group during time T and it is not necessary to illuminate all of the sectors of the disc, but only $\frac{1}{5}$ thereof. The $N/5$ information bits, or distance channels, are analyzed across the disc in accordance with known apparatus, such as photo diodes, numbering only $N/5$ arranged along each track and followed by integrators; or by optical systems such as fibre bundles, and projecting light on the photo cathode 19 of an analyzer tube only over a reduced zone, corresponding to the reduced, illuminated zone.

For each period of time T, it is thus necessary to read N or a fraction of $N/X$ distance information elements on a track, and for M tracks of Doppler-shifted distance elements, an array of $N.M$ or $N.M/X$ may be read. If one utilizes $p$ horizontal scanning lines of the tube 11, per track, the number of information elemental areas which must be scanned is $p$ times higher than that which is necessary for the band pass of the video signals, mainly $pMn/t$ or $PMN/XT$. Depending on whether the entire number of distance ranges are to be analyzed, or a more limited number, for example, or a fraction of $1/X$, and corresponding to a window or sub-group of distances within the entire distance range of the radar equipment.

The maximum range of the distance which can possibly be analyzed, in a described example, is $5\Delta d$, and is chosen in accordance with the maximum range of the radar set to be used. Utilization of this zone occurs with respect to the start of transmission and with reception as controlled by sources 1 and 9 with respect to the associated photo-receivers after transmission of light through the film. The showing of disc 5 in FIG. 4 again is not to be considered as a limitation. Similar results can be obtained, for example, by supplementary tracks corresponding to Doppler-shifted signals in sector 51 of a disc which permits analysis of a range of distance corresponding, for example to lines *f* and *g* of FIG. 5, that is, for example from 0 to 16.

In accordance with a feature of the invention, the use of a window 21, illuminated by source 1 and in optical light-receiving relation with photocathode 19 may be reproduced several times along the length of the tracck assembly of any one sector. The system may then utilize several light responsive tubes, each corresponding to a separate "distance to be explored" or predetermined range. As an alternative, means may be provided associated with the movement of the zone 21, over the extent of the sector ABCD and arranged in such a manner that K zones will have relative movements therewith over the extent $\Delta d$ in correspondence therewith.

Figure 8:
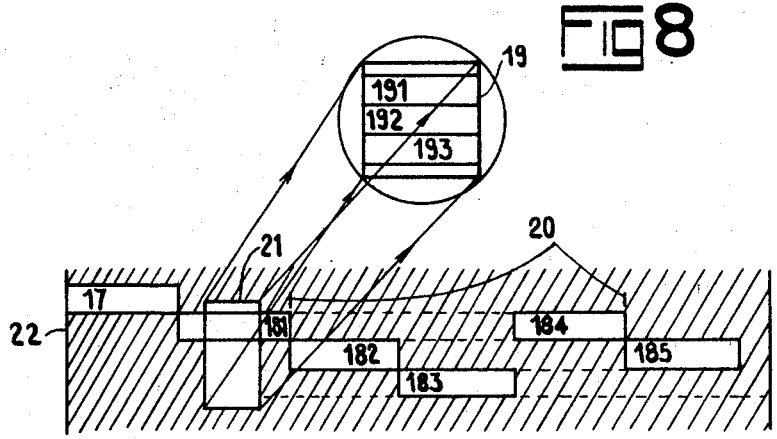
FIG. 8 illustrates, in schematic form, a portion of a developed arrangement in accordance with FIG. 3, and illustrating a modification thereof.

If the light analyzer tubes which are used, do not have targets which can carry out the integrating functions directly, that is, if they do not have a certain remanence, or persistance of the image, such as a mosaic of solid state circuits, the system described may still be utilized, and with excellent results and definition. Target 19 of the analyzer tube, in the above described system, is arranged so that the image projected thereon is divided into so many independent zones as arrays of tracks, or sequential measuring assemblies are provided—in the example described, five arrays. The first zone 191 of the target 19 is entirely scanned and erased, and thus cleared, after a time T of reading which is provided for, and during which integration of zone 192 is carried out and during the beginning of the time T of the integration of the zone 193. Thus, zone 191 may be re-used in order to record thereon the correlation products which correspond to the fourth array 184. Similarly zone 192 may thereafter be used to record the correlation function with respect to track array 185. Thus, only three zones of recording will be necessary on target 19, which simplifies the apparatus and, likewise, only three groups of optical light transmitting fibres will be necessary. FIG. 8 illustrates such an arrangement of track arrays on the film. Film 22 corresponds, for example, to the disc T of FIG. 4, or to a developed, lateral surface of a drum. A further advantage which is obtained by this modification is that a very large amount of information data may be handled by the analyzer tube. In an example, and utilizing the same fineness of definition, and the same number of scanning lines per track, the number of tracks corresponding to Doppler shifts can be doubled. The synchronizing track, symbolized by markers 20 (FIG. 4) can readily be programmed in order to control scanning of successive vertical images, for example, a first scan of an image in order to read the information of code arrays 181, 182 and 183, and thereafter a second scanning to read codes 184 and 185.

The optical correlation device described thus far may readily be adapted for use with a monopulse radar system. The receiver circuits will then have one sum channel and one difference channel, which requires multiplication by two:

in a radial direction with respect to the disc of the Doppler-shifted distance channels;
of the number of modulatable light sources, necessary for one channel;
and of the number of transducers and integrators.

The number of signals which are derived from each channel requires close synchronization and matching of the channels among each other, so that relative variations in the temporal characteristics of the components of the signals are minimized. The solution for this problem is the use of electronic-optical transducers (such as image analyzer tubes, mosaics of diodes or detectors, or the like) which are specially chosen and designed. In case of image and light analyzer tubes, as used in the television art, tubes in which two targets, scanned by two electron beams and controlled simultaneously from the same control system are suitable.

One of the difficulties with the use of optically coded discs resides in the engineering difficulty of aligning the images in a sector before projection of the photo cathode. Scanning of an analyzer tube which receives an image which converges towards a center, that is an image of a sector, may present difficulties. No such difficulties are experienced with a drum. On the other hand, the image carried on the drum arises on a curved surface which must be projected to the plane surface of the photo cathode of the tube, and thus again optical conversion difficulties are experienced. Again, compensation for distortion of the image must be done optically, but such cylindrical distortion is easier compensated for than a converting distortion due to recording on a sector, such as is the case with a disc.

The modulatable light sources may, for example, be arsenic-gallium diodes having response times in the order of several nanoseconds, that is a very rapid response.

Transmission of the modulated light energy to the plane of the film may be done by means of optical systems known in the art, preferably optical systems having a large aperture-to-focal length ratio in order to transmit the maximum radiation which can be obtained, or by means of fibre optics of non-coherent distribution. Fibre optics have a certain advantage in that they require but little space and have low light attenuation. The transfer efficiency of certain fibres may be 90% for lengths in the order of 30 cm. Fibre optics may also be used in order to transmit the image of the Doppler-shifted arrays of codes from the film unto the face of the analyzer tube, providing for good rendition as well as possible enlargement in order to provide utilization of the sensitive surface of the tube to its maximum extent. Fibre optics may, additionally, avoid diffraction phenomena which may arise at the trailing ends of the code arrays. They also make easier the transformation of the image of the reference codes on a disc sector into a rectangular image which is better adapted to the normal sweep of the associated image analyzer tube. Thus a suitable arrangement of the fibres in a bunch allows to obtain input and output images of any desired shape.

The correlation system described is particularly useful for the analysis of pseudo-randomly phase coded radar signals, and particularly in order to obtain high precision and high resolving power by providing for a large number of Doppler-shifted channels. The system is applicable, for example, to long range radar having a range of 3000 km., and utilizing pulse compression. With such a system, a distance resolution of 300 meters, corresponding to a resolution of Doppler shift of 200 Hz. within a frequency spectrum of 10 kHz. would require 500,000 Doppler filters. An apparatus in accordance with the present invention, and utilizing a single drum and several optical analyzer tubes is readily capable of resolving these 500,000 Doppler shift coded signals. The distance measurement is carried out by successive samplings of up-ranges within the distance capability of the radar in time periods corresponding to the repetition rate of radar transmission. The described system provides for receiver circuits for such radar systems which are small in number with respect to the resolution obtained and providing a response output which is almost instantaneous with respect to the distance and radial speed later obtained from the targets scanned by the radar beam. The number of Doppler-shifted tracks is determined as a function of the minimum speed differences for which the design is intended, and the resolution of the Doppler-shifted signals will correspond, for example, to minimum sampling.

FIG. 9 illustrates an optical correlation device operating in real time and using a disc together with fibre optics bunches and conventional optical device. The useful zone of the disc is illuminated from a light source 196 modulatable by signal transmitted through a bunch of fibre optics of a conical structure 197. With such an arrangement the input of the fibre bunch is adapted to the small dimensions of the light source while the output of the bunch is suitably adapted to the greater dimensions of the zone to be illuminated. Naturally the cross-section of an elementary fibre is so chosen as to be smaller than the dimensions of the information which is inscribed on the disc. The sector image of the useful zone, which is illuminated by means of a first fibre bunch is projected by means of a conventional optical device 198, having a suitable magnifying factor to an input sector 199 of a second fibre bunch 200. In this second bunch, the elementary fibres are so arranged that their outputs in a plane form a rectangle which is easily scanned by a conventional image analyzer tube 201. In that case, however, the tube comprises a window which consists of a fibre optics bunch in which the elementary fibres are coherently disposed. The photo cathode is directly deposited on the surface of the fibre bunch inside the tube. Obviously the elementary fibre is selected in accordance with the desired resolution i.e. the width of the information point to be inscribed on the tube.

FIG. 10 illustrates in a schematic form, an optical correlator operating with a dual channel drum which makes use of fibre optics to illuminate the reference codes and to transmit the images together with matrices of integrating and reading out photosensitive cells.

The two channels are denoted 202–203 and carry the signals to be correlated to the modulatable light sources 204, 205. The modulated signals are transmitted by means of two sets of fibre optics bunches 206–207 and 208–209 to corresponding matrices of photosensitive cells 210–211 through reference code track 212 on the surface of the drum 213. References 214, 215 denote integration circuits and reference 216 applies to information processing and reading out circuits.

Although FIG. 10 discloses a fibre optics bunches to transmit images, it may be worth noting that the matrices of photosensitive cells can be used without these fibre optics. In that case, their dimensions have to be chosen so as to adapt to the zone of the drum which carries the signals and are located in the immediate vicinity of the drum.

In the case where a disc is used as carrying the reference information, the matrices can be located in the immediate vicinity of the disc and present a structure which is adapted to the shape and dimensions of the considered sectors of the disc.

The use of matrices presents two great advantages. There is no remanence resulting in the improved capability processing more information in a given time. There is a big reduction of the volume of the correlator because of the possibility of having this integrating and reading out circuit, integrated within the matrices.

The invention has been described in connection with pseudo-randomly phase coded radars and particularly in connection with drums and discs carrying optical correlation data thereon. Various structural changes and modifications, as determined by the requirements of particular applications or uses may be made without departing from the inventive concept.

What we claim is:

1. Real time optical integration system to decode radar signals pseudo-randomly coded, and to obtain outputs providing transformation of predetermined Doppler effect functions comprising a modulatable light source (1) with signals to be analyzed;
   the combination of a rotatable coded carrier (2, 5) and light responsive means (3, 30, 11) forming a parallel signal analysis means to transform predetermined Doppler effect functions, said coded carrier being rotatable with respect to said light source, said light responsive means converting said amplitude modulated light from said source after passing through said carrier into electrical signals, said coded carrier carrying a transmitter control track in pseudo-random code, and decoding tracks, in the form of variations in light transmissivity of said carrier;
   reference means (FIG. 3: 8, 12, 15) arranged on said carrier and providing reference signals to said signal analysis means;
   integration means (4, 19) integrating signals received by said light responsive means,
   characterized in that
   the transmitter control track presents N digits during a time T of movement with respect to said source, said decoding track having K similar decoding track arrays each having a decoding passing time of duration T, wherein K is a whole number and greater than 1;
   and in that said decoding tracks are arranged on the carrier for sequential presentation to said light responsive means, transversely and longitudinally offset with respect to said source by at least the width of any one array, each of said tracks being coded to represent predetermined ranges of distance and, upon illumination by said source, reproducing a predetermined, separate function of said code as transformed by the Doppler effect.

2. System according to claim 1 wherein said movable carrier is a rotating drum, said drum having said codes arranged thereon along the circumference thereof, different tracks of said codes being geometrically identical and transversely staggered and moving with the same linear speed.

3. System according to claim 1 wherein said movable code carrier is a rotating disc having said codes arranged thereon in sectors, different tracks of said code being staggered radially and being geometrically different, and moving at different linear speeds.

4. System according to claim 1 wherein said code carrier has $n$ decoding tracks and wherein said light responsive means includes K analyzing means of $p=n.m$ photo responsive means arranged in a matrix of $n$ rows and $m$ columns, and wherein $m$ corresponds to the number N of the total digits of the pseudo-random code, or a whole fraction $N/X$ thereof.

5. System according to claim 4 including a plurality of Y similar photo responsive means, each coupling $N/X$ distance channels, and wherein $Y=N/X$.

6. System according to claim 5 wherein said matrix is a diode matrix.

7. System according to claim 1 wherein said K analyzing means includes a light responsive scanning beam tube having a photo cathode providing elemental information areas, said photo cathode being of the integrating type to form said integrating means, said tube being located in light receiving relation with respect to said code carrier;
   said tube providing K horizontal zones, for reading, and subsequent erasing of $p$ elements on said photo cathode during the time T, after integration of signals on the photo cathode itself is completed, said time T being similar to the time duration during which the code is transmitted.

8. System according to claim 7 wherein said reference means is coupled to said tube to synchronize the scanning of the beam of said tube;
   and wherein the information data projected on said photo cathode is read with a delay of from T to 2T after arrival of the echo signal.

9. System according to claim 7 including an assembly of fibre optics transmitting light from said coded carrier to the photo cathode of said tube.

10. System according to claim 1 wherein said decoding tracks are arranged on said coded carrier to provide for three first assemblies subsequently reproduced thereon in shifted location to provide for a pattern wherein an assembly of the order of $1+3n$ will be at the same track row as an assembly of $1+3(n-1)$, an assembly in the order of $2+3n$ will be at the same track row as an assembly of $2+3(n-1)$, etc.;

and three groups of $p$ photo responsive means are provided.

11. In a radar system with pseudo-randomly phase coding having a transmission time T during a transmission cycle, and a correlation system coupling K successive samples of echo signals corresponding to K distance ranges, said correlation system comprising a modulatable light source;

means amplitude modulating said light source with received signals to be analyzed;

signal analysis means to analyze Doppler-shifted received signals including a coded carrier and a light responsive means, said coded carrier being movable with respect to said light source and carrying pseudo-random codes in the form of variations in light transmissivity thereof, each reproducing a predetermined, separate function of the transmitted code as shifted by the Doppler effect due to movement of the target in the transmitted beam of the radar system, said light responsive means converting amplitude modulated light from said source, after passing through said carrier, into electrical signals;

said coded carrier having further K similar decoding track assemblies, wherein K is a whole number greater than 1, each passing past said amplitude modulatable light source during said time T and each K decoding assembly being offset with respect to an adjacent decoding assembly transversely and longitudinally relative to the direction of motion of said carrier;

and integration means integrating signals received by said light responsive means.

References Cited

UNITED STATES PATENTS

| | | | |
|---|---|---|---|
| 3,030,021 | 4/1962 | Ferre | 235—181 |
| 3,052,843 | 9/1962 | Hurvitz. | |
| 3,088,113 | 4/1963 | Rosenthal. | |
| 3,184,679 | 5/1965 | Kuehne | 343—100.7 X |
| 3,355,579 | 11/1967 | Robertson. | |

OTHER REFERENCES

Talamini et al.: New Target for Radar: Sharper Vision With Optics, Electronics, Dec. 27, 1965, pp. 58–66.

RODNEY D. BENNETT, JR., Primary Examiner

D. C. KAUFMAN, Assistant Examiner

U.S. Cl. X.R.

235—181; 343—9, 17.2